United States Patent [19]

Ruggiero et al.

[11] Patent Number: 4,901,093
[45] Date of Patent: Feb. 13, 1990

[54] METHOD AND APPARATUS FOR PRINTING WITH INK JET CHAMBERS UTILIZING A PLURALITY OF ORIFICES

[75] Inventors: Richard Ruggiero, Danbury; William R. Gardner, Wilton; Robert L. Rogers, Sandy Hook, all of Conn.

[73] Assignee: Dataproducts Corporation, Woodland Hills, Calif.

[21] Appl. No.: 236,327

[22] Filed: Aug. 22, 1988

Related U.S. Application Data

[63] Continuation of Ser. No. 89,020, Aug. 24, 1987, abandoned, which is a continuation of Ser. No. 801,926, Nov. 26, 1985, abandoned.

[51] Int. Cl.⁴ .................... G01D 15/16; B41J 3/04
[52] U.S. Cl. .................... 346/140 R; 346/1.1
[58] Field of Search ............ 346/140, 75, 1.1

[56] References Cited

U.S. PATENT DOCUMENTS

| | | | |
|---|---|---|---|
| 3,584,571 | 6/1971 | Schmoll | 346/75 X |
| 3,747,120 | 7/1973 | Stemme | 346/75 |
| 3,787,881 | 1/1974 | Duffield | 346/75 |
| 3,958,255 | 5/1976 | Chiou | 346/75 X |
| 3,974,508 | 8/1976 | Blumenthal | 346/140 |
| 4,032,928 | 6/1977 | White | 346/75 X |
| 4,131,899 | 12/1978 | Christou | 346/140 |
| 4,138,687 | 2/1979 | Cha | 346/75 |
| 4,188,635 | 2/1980 | Giordano | 346/75 |
| 4,216,483 | 8/1980 | Kyser et al. | 346/140 |
| 4,374,388 | 2/1983 | Heinzl | 346/140 |
| 4,459,601 | 7/1984 | Howkins | 346/140 |
| 4,480,259 | 10/1984 | Kruger | 346/140 |
| 4,521,786 | 6/1985 | Bain | 346/140 |
| 4,533,925 | 8/1985 | Tsao et al. | 346/75 |
| 4,611,219 | 9/1986 | Sugitani | 346/140 |
| 4,714,934 | 12/1987 | Rogers | 346/140 R |

FOREIGN PATENT DOCUMENTS

| | | |
|---|---|---|
| 0084891A2 | 8/1983 | European Pat. Off. . |
| 2835567 | 3/1979 | Fed. Rep. of Germany . |

OTHER PUBLICATIONS

Snyder, Roger R. D., "A Segmented Drop Generator", *Xerox Disclosure Journal*, vol. 9, No. 2, Mar./Apr. 1984, pp. 125-127.

*Primary Examiner*—Joseph W. Hartary
*Attorney, Agent, or Firm*—Woodcock Washburn Kurtz Mackiewicz & Norris

[57] ABSTRACT

An impulse ink jet apparatus provides bar coding using one or more ink jet chambers having a plurality of orifices in each chamber. A transducer is coupled to each chamber for ejecting droplets from each of the plurality of orifices in the chamber in response to the state of energization of the transducer.

26 Claims, 4 Drawing Sheets

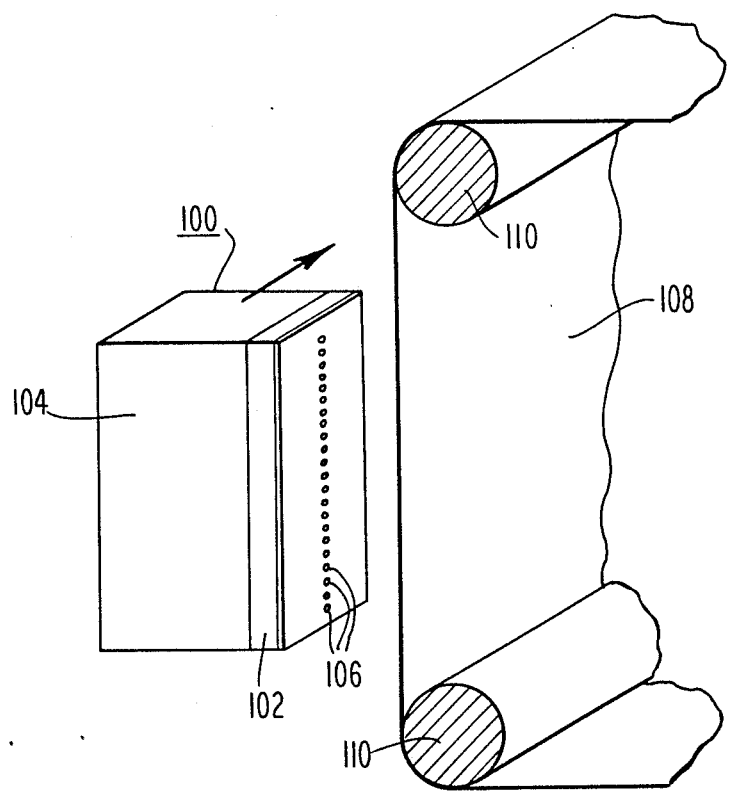
*Fig. 8*
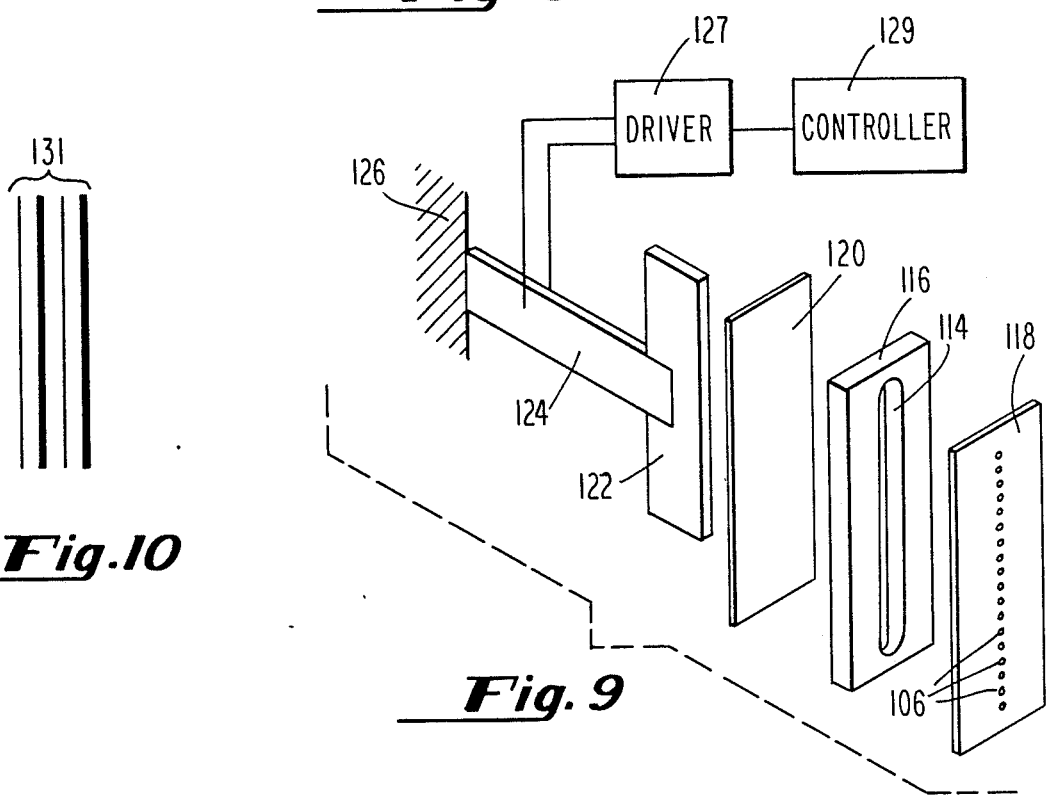
*Fig. 10*
*Fig. 9*

U.S. Patent  Feb. 13, 1990  Sheet 4 of 4  4,901,093
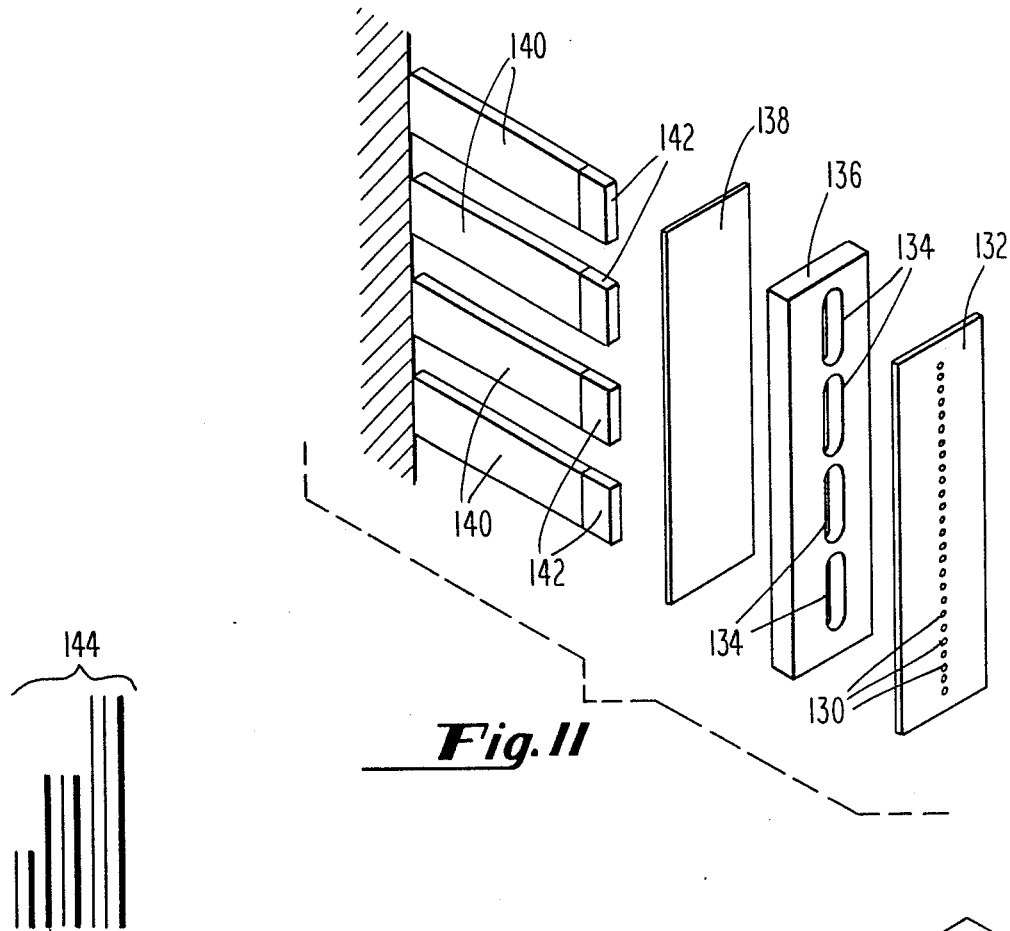
Fig. 11
Fig. 12
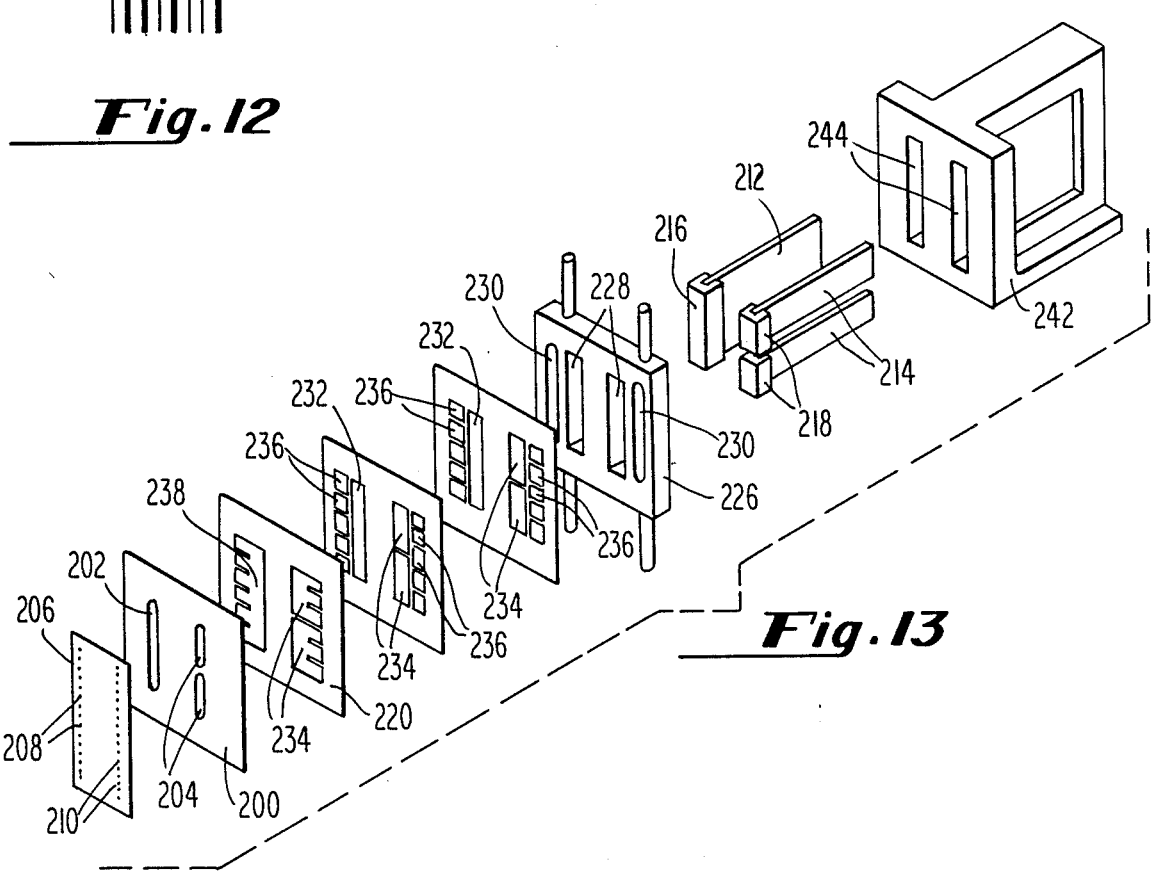
Fig. 13

METHOD AND APPARATUS FOR PRINTING WITH INK JET CHAMBERS UTILIZING A PLURALITY OF ORIFICES

This is a continuation of application Ser. No. 089,020, filed Aug. 24, 1987, now abandoned, which, in turn, was a continuation of now abandoned Ser. No. 801,926, filed Nov. 26, 1985.

BACKGROUND OF THE INVENTION

This invention relates to impulse or drop-on-demand ink jet printers. This invention also relates to printers which are capable of printing bar codes.

In an impulse or drop-on-demand ink jet, a single chamber, including a single ejection orifice is provided. A droplet of ink is ejected from the single orifice in response to a contraction of volume in the chamber typically caused by the state of energization of a transducer which may be made, for example, from a piezoelectric material.

Ink jet printers employing impulse of drop-on-demand ink jets typically have the same resolution in both the X and Y direction. This resolution permits a wide range of printing, including bar codes as well as alpha-numeric characters. However, a full channel is required for each droplet ejected.

SUMMARY OF THE INVENTION

It is an object of this invention to provide a simplified and lower cost ink jet apparatus by minimizing the required number of channels.

In accordance with the foregoing object, driver circuitry, memory and buffer for the apparatus may be greatly simplified and reduced in cost.

It is also an object of this invention to provide an impulse ink jet printer of improved reliability.

In accordance with these and other objects of the invention, an impulse ink jet apparatus comprises the chamber, including an inlet and a plurality of ejection orifices and an ink supply means coupled to the inlet of the chamber. The apparatus further comprises means for simultaneously ejecting a plurality of droplets from the orifices. The orifices may be arranged in any predetermined pattern.

In accordance with one important aspect of the invention, the apparatus may be utilized for bar code printing where a greater resolution is required in one direction (i.e., the width of the bar) as compared with the resolution required in the other direction (i.e., the height or length of the bar).

In accordance with another important aspect of the invention, at least one additional chamber, including a plurality of orifices, may be utilized. The ink supply means is also coupled to the chamber with means for simultaneously ejecting a plurality of droplets from the orifices of the at least one additional chamber.

In one embodiment of the invention, the additional chamber is positioned with respect to the first-mentioned chamber such that a linear array of orifices in one chamber is parallel or co-linear with a linear array of orifices in another chamber. In this configuration, a bar having an overall length equal to the composite length of the array of orifices in the chambers is achieved. In the alternative, the orifices may be aligned in a parallel manner but the chambers may be displaced in the scanning direction. The droplets are ejected from the different chambers in a time delayed fashion while the orifices scan relative to the target so as to create a bar on the target having an overall length equal to the composite length of the orifices in the various chambers.

In accordance with another important aspect of the invention, droplets from only certain chambers are ejected so as to permit bars of different lengths to be generated. For example, the orifices of one chamber, corresponding to a short bar length, eject droplets while droplets are not ejected from orifices of another chamber. On the other hand, all orifices of all chambers may eject droplets to provide a bar on the target of greater height or length.

In the preferred embodiment of the invention, means for ejecting droplets from the orifices comprises a transducer for each chamber. The transducer of each chamber may be separately energized and de-energized such that the droplets are ejected in response to the change of state of the transducer.

In the preferred embodiment of the invention, each orifice of the invention is in open communication with the other orifices without benefit of intra-chamber intermediate restrictors. The transducer is coupled to a single wall of the chamber and, preferably, the wall is juxtaposed to the orifices.

In the preferred embodiment of invention, the transducer comprises an elongated member having an axis of elongation and the transducer means is adapted to expand and contract along the axis of elongation in response to the state of energization. In some instances, it may be desirable to provide the transducer with a foot which itself forms the wall of the chamber.

In accordance with another important aspect of the invention, the droplets from the orifices of a given chamber are preferably ejected along parallel paths which are aligned so as to form a bar on the target. Preferably, the droplets are ejected at substantially the same or uniform velocity from each of the orifices in the chamber.

In another embodiment of the invention, a plurality of chambers with a plurality of linerarly-aligned orifices in each chamber is disposed in a manner so as to be capable of forming segments of an alpha-numeric character. In order to generate various alpha-numeric characters, droplets are ejected from selected chambers corresponding to particular alpha-numeric characters.

BRIEF DESCRIPTION OF THE DRAWINGS

FIG. 8 is a perspective view of another embodiment of the invention employing an enlarged linear array of orifices;

FIG. 9 is an exploded perspective view of the print head shown in FIG. 8;

FIG. 10 illustrates a bar code generated by the apparatus of FIGS. 8 and 9;

FIG. 11 is an exploded view of an alternative embodiment of the invention;

FIG. 12 illustrates bar codes which can be generated by the apparatus of FIG. 11; and FIG. 13 is an exploded perspective view of a print head representing another embodiment of the invention.

DETAILED DESCRIPTION OF PREFERRED EMBODIMENTS

Figure 1:
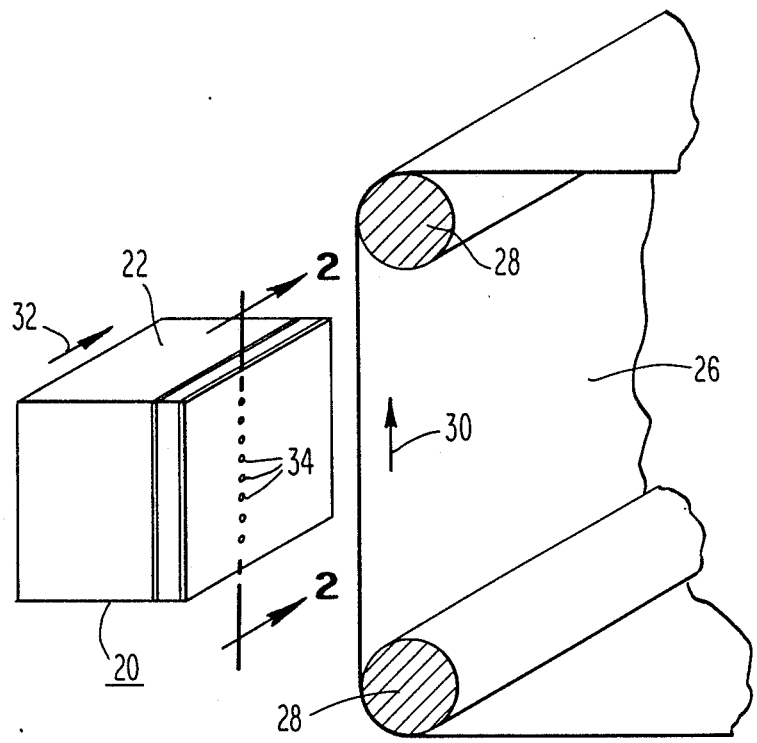
FIG. 1 is a perspective view of a system depicting the invention incorporated in the bar code printer.

Referring to FIG. 1, an impulse or drop-on-demand ink jet print head 20 includes a reservoir 22 and an imaging head 24 which is juxtaposed to a target in the form of paper 26. The paper 26 is advanced by means of mechanism 28 so as to move the paper in increments in the direction indicated by arrow 30. In each position or increment of the paper, the print head 20 scans in the direction indicated by the arrow 32.

In accordance with this invention, a plurality of orifices 34 are linearly arranged as depicted in FIG. 1. However, unlike the prior art, a plurality of the orifices 34 is associated with a single impulse ink jet chamber which will now be described in detail with reference to FIGS. 2 and 3.

Figure 2:
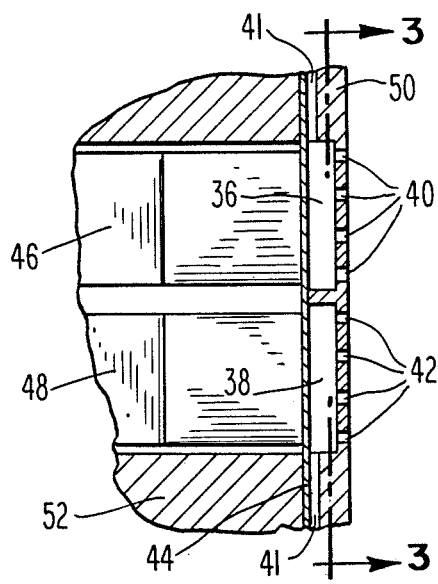
FIG. 2 is a sectional view of the bar code printer head of FIG. 1 taken along line 2—2 of FIG. 1.

As shown in FIG. 2, there are two chambers 36 and 38 and each of those chambers includes a total of four orifices 40 and 42, forming an elongated linear array that is substantially coextensive with its respective chamber 36 and 38. Each chamber 36 and 38 is served by a restricted inlet 41 which supplies ink from the reservoir 22 shown in FIG. 1.

The rear of the chambers 36 and 38 is formed by a wall comprising a diaphragm 44 which is coupled to transducers 46 and 48 associated with chambers 36 and 38 respectively. As shown in FIG. 2, the chambers 36 and 38 are formed in a chamber plate 50 while the transducers 46 and 48 are mounted in a body 52.

Figure 3:
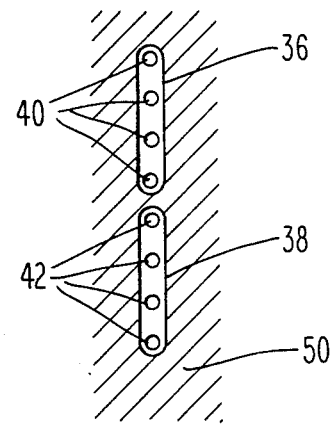
FIG. 3 is a sectional view of the chambers within the bar code printing head taken along line 3—3 of FIG. 2.

As shown in FIG. 3, the linear array of orifices 40 and the linear array of orifices 42 are parallel and co-linear. As a result, simultaneous ejection of droplets will produce a bar on a target such as the paper 26 shown in FIG. 1 which has an overall length equal to the composite length of the array of orifices 40 and 42.

In accordance with this invention, a change in state of the energization of the transducer 46, for example, will move the wall comprising the diaphragm 44 substantially as a plane toward the orifices 40 and result in the ejection of droplets from the orifices 40 at substantially equal velocity. By simultaneously changing the state of energization of the transducer 48, to move the wall comprising the diaphragm 44 substantially as a plane toward the orifices 42 droplets can also be ejected at substantially equal velocity from each of the four orifices 42 and, under those circumstances, the result is a bar equal to the composite length of the array of orifices 40 and the array of orifices 42. On the other hand, if only one of the transducers 46 or 48 is energized, a bar will be generated equal to only the length of one of the arrays of orifices 40 or 42.

Figure 3A:
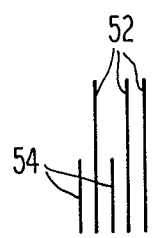
FIG. 3(a) depict bar codes which may be printed utilizing the apparatus of FIGS. 1–5.

Referring now to FIG. 3(a), it will be seen that bars of different lengths may be generated depending upon the number of transducers energized. As shown in FIG. 3(a), bars 52 have substantially double the length of bars 54. In this type of bar code, bars 52 may correspond to, for example, the digit one and the short bars 54 may correspond to the digit zero. Such a code is utilized by the U.S. Postal Service and is referred to as the POSTNET code.

Figure 4:
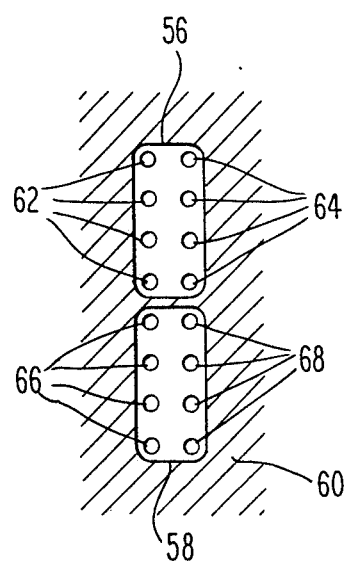
FIG. 4 is a sectional view of the chambers of an alternative bar code printer constructed in accordance with this invention.

Referring now to FIG. 4, another ink jet apparatus is disclosed comprising chambers 56 and 58 and a chamber plate 60. The apparatus is substantially identical to that shown in FIGS. 2 and 3, except that two linear arrays of orifices 62 and 64 are contained within the chamber 56 and two linear arrays of orifices 66 and 68 are contained within the chamber 58, each such linear array being substantially coextensive with its respective chamber 56 and 58. The bar code generated by the apparatus shown in FIG. 4 is substantially identical to that shown in FIG. 3(a) except that the width of the bar is slightly greater. However, the horizontal resolution still remains greater than the vertical resolution.

Figure 5:
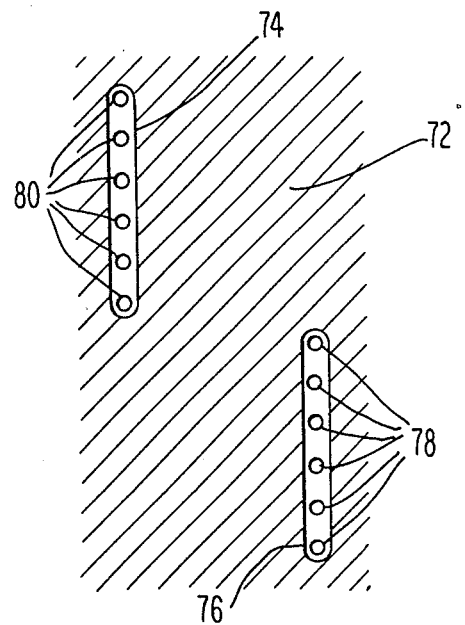
FIG. 5 is a sectional view of chambers in a bar code printer representing yet another embodiment of the invention.

Referring to FIG. 5, a chamber plate 72 of an imaging head is shown wherein chambers 74 and 76 are parallel but displaced along the scanning direction as depicted by the arrow 75. Once again, however, each chamber 76 and 74 includes a plurality of orifices 78 and 80 respectively, each such linear array being substantially coextensive with its respective chamber 76 and 74.

The imaging head shown in FIG. 5 will lay deposit droplets on a target in a bar configuration using apparatus of the type shown in FIG. 1. This is accomplished by energizing a transducer not shown which is associated with the chamber 74 so as to simultaneously eject a plurality of droplets from the orifices 80 and subsequently, after a time delay, energizing transducers associated with the chamber 76 so as to simultaneously eject another plurality of droplets from the orifices 78 and deposit the remainder of the bar previously deposited by droplets from the orifices 80.

Figure 6:
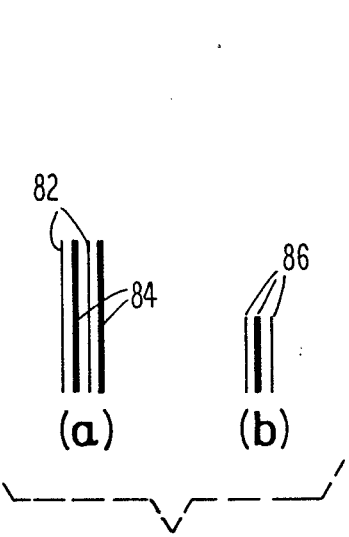
FIG. 6 illustrates a bar code which may be generated by the apparatus of FIGS. 1–5.

It will, therefore, be appreciated that the same bar coding results may be achieved by the chamber and orifice configurations of FIGS. 2-5 in order to achieve the bar code as depicted in FIG. 3(a). However, it will also be appreciated that a high degree of resolution in the direction of scanning, i.e., one orifice wide resolution, permits bar coding of the type wherein the width of the bar is the information-carrying factor. Bar coding of this type is shown in FIGS. 6(a) and 6(b).

As shown in FIG. 6(a), the bar code has a height or length equal to the composite height or length of the orifices in the devices shown in FIGS. 1-5. However, the bars 82 are narrow as contrasted with the bars 84, and the information content is coded into the widths of the bars, the widths of the spaces therebetween and the combinations of those widths.

In FIG. 6(b), the bar code is of a length or height equal to the length or height of the orifices in only one of the chambers so as to produce shorter bars 86 of various widths with information content therein. In order to produce the bars shown in FIGS. 6(a) and 6(b), the transducers associated with the chambers are energized at the appropriate times so as to deposit a single row of droplets on the target or paper forming a narrow bar or to deposit multiple rows of droplets in rapid succession to create wider bars. All of this occurs while the print head scans the target in a direction generally transverse to the bars.

In bar coding of the type shown in FIGS. 6(a) and 6(b), it is of course particularly important to have a high degree of resolution in the direction of scanning, i.e., transverse to the bars, as compared with the degree of resolution in a direction parallel with the bars. Since a high degree of resolution is required in only a single direction, this invention is ideally suited for bar coding with its attendant advantages of eliminating complexity in the imaging head, including the reduction of the number of chambers and transducers as well as reducing the complexity of the drive circuitry, memory and buffers associated with the transducers.

Figure 7:
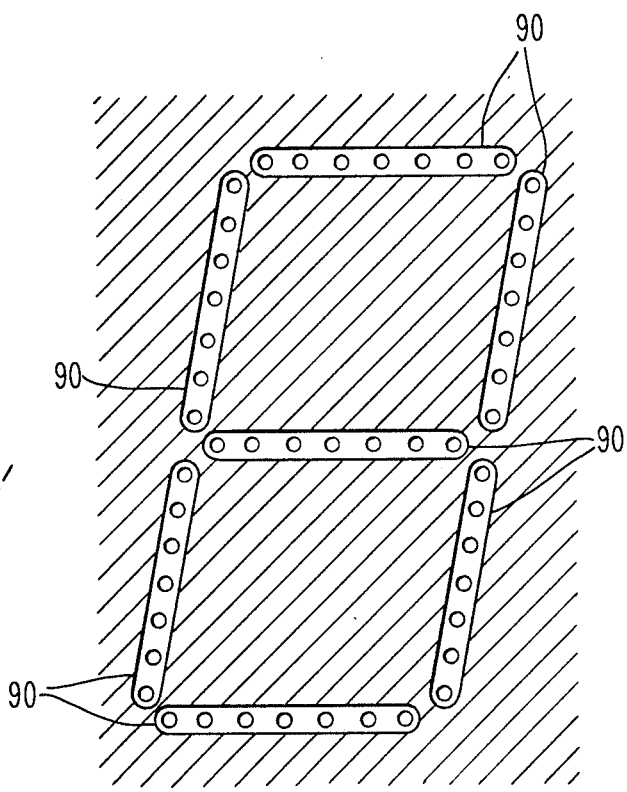
FIG. 7 depicts chambers in accordance with this invention which may be utilized in printing alpha-numeric characters.

In accordance with this invention, the orifices associated with any one chamber are arranged in a predetermined pattern. With the orifices of a chamber or a plurality of chambers aligned in parallel manner, the invention lends itself to bar coding. However, another pattern of chambers and orifices within an chamber may be selected. As shown in FIG. 7, a chamber plate 88 comprises a plurality of chambers 90. Each of the chambers 90 includes a linear array of ejection orifices 92, each such linear array being substantially coextensive with its respective chamber 90.

As shown in FIG. 7, the chambers 90 are arranged so as to permit the printing of alpha-numeric characters by selectively energizing the transducers associated with particular chambers 90. As a result, alpha-numeric characters may be printed with substantial clarity with a seven channel device. It will, of course, be appreciated that more chambers may be utilized to achieve a higher degree of resolution but in all cases the complexity of the overall apparatus is reduced even though the total number of ejection orifices is not compromised.

Referring now to FIG. 8, a printing head 100 is shown having an imaging head 102 and a reservoir 104. The imaging head 102, which includes a plurality of orifices 106, is juxtaposed to a target in the form of paper 108, mounted on a transport mechanism 110.

As shown in FIG. 8, the orifices 106 are capable of depositing an entire bar on the paper 108 as the imaging head 102 is scanned in the direction shown by the arrow 112. The width of the bar deposit may be controlled by the sequentially ejecting droplets from the orifices 106 so as to deposit substantially contiguous linear arrays of dots, thereby providing a modulated or controlled width of the bar as the imaging head 102 scans the paper 108.

As in the previous embodiments of the invention, a plurality of the orifices 106 is associated with, in this case, a single chamber 114, such orifices 106 forming an elongated array that is substantially coextensive with the chamber 114. The chamber 114 is located in a chamber plate 116 which is adapted to be covered by an orifice plate 118 containing the orifices 106. A diaphragm 120 is secured to the rear of the chamber plate 116 and is juxtaposed to an enlarged foot 122 attached to a transducer 124. As shown in FIG. 9, the transducer 124 is affixed to a firm, relatively immovable surface 126, and energized by a driver 127 in response to a controller 129.

It will be appreciated that energization of the transducer 124 will simultaneously eject droplets through the orifices 106 by moving the diaphragm 120 substantially as a plane toward the orifices 106 so as to create elongated bars as shown in FIG. 10. As earlier mentioned, the width of these bars may be modulated or controlled by the controller 129 so as to provide information content in the traditional bar coding sense as depicted by bars 131 shown in FIG. 10.

FIG. 11 illustrates another embodiment of the invention wherein a plurality of orifices 130 in an orifice plate 132 are juxtaposed to four separate aligned chambers 134 and a chamber plate 136. The rear of the chamber plate 136 is covered by a diaphragm 138 juxtaposed to four separately energizable transducers 140, having respective feet 142.

By selecting the number of transducers 140 which are energized in response to a driver and controller not shown, the overall height of the bars deposited in a suitable target may be controlled. In FIG. 12, bars 144 of four different heights are illustrated, all of which are capable of being generated by the apparatus of FIG. 11.

An apparatus incorporating the various chamber and orifice configurations previously discussed is shown in FIG. 13. Referring now to FIG. 13, the chamber plate 200 comprising a first elongated chamber 202 located along side two vertically aligned chambers 204 which are half the length of the chamber 202 is juxtaposed behind an orifice plate 206. The plate 206 includes a first vertically disposed, linear array of orifices 208 in front of the chamber 202 and substantially coextensive therewith, and a second vertically disposed, linear array of orifices 210 located in front of the chambers 204 and substantially coextensive therewith.

The ejection of droplets from orifices 208, 210 or half the orifices 210 is controlled by the selective energization of the elongated transducer 212 and 214. More specifically, the elongated transducer 212 is juxtaposed to the orifices 208. Transducers 214 are juxtaposed to chambers 204. An elongated foot 216 is coupled to the transducer 212 and feet 218 are coupled to the transducers 214.

By energizing the transducers 212 and 214 in the manner so as to create expansion and contraction along the axis of elongation, the feet 216 and 218 are advanced substantially as a plane toward and retracted away from the plurality of orifices 208 and 210 in the chambers 202 and 204 so as to selectively eject droplets from the orifices 208 and 210. The manner in which the feet 216 and 218 are coupled to the chambers 202 and 204 will now be discussed.

Immediately behind the chamber plate 200 are four layers comprising a restrictor plate 220, a first foot plate 222, a second foot plate 224 and a manifold plate 226. The manifold plate 226 includes parallel slots 228 which are adapted to receive the feet 216 and 218. Along side the slots 228 are elongated manifolds 230 which supply ink to the chambers 202 and 204 as well as the associated orifices. The foot plates 222 and 224 comprise elongated openings 232 and 234 through which the feet 216 and 218 extend. Additional vertically aligned openings 236 are provided as a means of supplying ink from the manifold 230 to the chambers 202 and 204. This supply of ink passes through openings 238 and 240 in the restrictor plate 220.

In the preferred embodiment of FIG. 13, it will be appreciated that the feet 216 and 218 may be secured to the foot member 224 by means of a resilient rubber-like material, such as silicon which is marketed under the name RTV. The ends of the transducers 212 and 214 may be cemented to the feet 216 and 218 by means of a suitable adhesive such as, for example, an epoxy. This "potted foot" configuration is presently preferred over the diaphragm designs illustrated in the aforementioned figures for reasons of reliability and durability.

The entire assembly of plates and transducers shown in FIG. 13 is mounted on a body 242 which includes elongated openings 244 which receive the transducers 212 and 214. Transducers 212 and 214 are secured to the body 242 in a manner such that expansion and contraction will advance and retract the feet 216 and 218 substantially as a plane toward the plurality of orifices 208 and 210 in the orifice plate 206.

It will be appreciated therefore that the apparatus shown in FIG. 13 is capable of generating long bars or short bars or two short bars which, when combined, form a long bar for bar coding purposes. Bar coding of the type shown in FIG. 3(a) may therefore be achieved utilizing the apparatus of FIG. 13. At the same time, it is possible to sequentially energize transducers 212 and 214 in a manner and at the appropriate time so as to width-modulate the bars and achieve bar coding of the type shown in FIG. 6.

It will be appreciated that variously sized orifices may be utilized in the invention as described above with various spacings and arrays of various lengths. One particularly suitable orifice size is 0.001 to 0.002 inches with a spacing between orifices of 0.003 to 0.007 inches. However, the orifices should be spaced a sufficient distance from the walls of the chamber extending parallel to the axis of the orifices so as to assure ejection of droplets from all orifices at substantially uniform velocity. In general, it is preferred that the spacing to the closest wall be at least half of the spacing between the closest orifices.

In some instances, bar lengths of 0.125 to one inch are desirable. Where bar length or height modulation is employed as shown in FIG. 3(a) it is generally desirable to have bar width of at least 0.020 inches. This may require the side-by-side orifice configuration as shown in FIG. 4. Preferably, the overall height or length of the bar is achieved by orifices of a density of 120/inch to 240/inch.

In order to generate the bars as described herein, suitable drive circuitry for the transducers will be utilized. In this connection, it is possible to eject droplets in response to a single pulse supplied on demand to the transducers. However, it may be desirable to utilize the multi-pulsing technique, such as that disclosed in co-pending application Ser. No. 453,295, filed Dec. 27, 1982, now abandoned, its continuation application, Ser. No. 857,517, filed Apr. 22, 1986 and now abandoned in favor of its continuation application Ser. No. 117,351, filed Oct. 27, 1987, and Ser. No. 600,785, filed Apr. 4, 1984, now abandoned, its continuation application, Ser. No. 821,599, filed Jan. 23, 1986 and now abandoned in favor of its continuation application Ser. No. 126,476, filed Nov. 30, 1987, each of which is assigned to the assignee of this invention and incorporated herein by reference. Where such a multi-pulsing technique is utilized, a greater coverage may be achieved since a greater volume of the ink is ejected.

The transducers which have been shown and described herein are elongated and expand and contract along the axis of elongation in response to energization of the application of voltages transverse to the axis of elongation. Details concerning such an ink jet apparatus are set forth in U.S. Pat. No. 4,822,418, which is incorporated herein by reference. It will, of course, be appreciated that other transducer configurations may be utilized to generate predetermined patterns through a plurality of orifices in accordance with this invention.

Various inks may be employed in the method and apparatus of this invention. However, one particularly desirable ink is disclosed in U.S. Pat. No. 4,822,418, assigned to the assignee of this invention and incorporated herein by reference. In addition, it is possible to utilize a so-called phase change or hot-melt ink such as that disclosed in co-pending application Ser. No. 610,627, filed May 16, 1984, now abandoned, its continuation application Ser. No. 938,334, filed Dec. 4, 1986 and now abandoned in favor of its continuation application Ser. No. 093,151, filed Sept. 2, 1987, assigned to the assignee of this invention which is also incorporated herein by reference.

Although particular embodiments of the invention have been shown and described and various modifications suggested, it will be appreciated that other embodiments and modifications which fall within the true spirit and scope of the invention as set forth in the appended claims will occur to those of ordinary skill in the art. For example, another embodiment of the invention is shown and described in U.S. Pat. No. 4,714,934, which is incorporated herein by reference. By way of further example, those of ordinary skill will appreciate that the relative movement between the head and paper may also be accomplished by moving only the paper or only the head.

Those of ordinary skill will further appreciate that multiple orifice chambers, such as a multiple orifice chamber having three (3) orifices located at the points of an equilateral triangle, may be utilized to increase dot size.

In view of the above, those of ordinary skill will also appreciate that other types of transducers, such as voice coils, lenders, bubble generators, etc., may be substituted for the particular transducers disclosed herein.

We claim:

1. An impulse ink jet apparatus comprising:
   an elongated chamber including an inlet, a first wall having a plurality of ejection orifices forming an elongated array substantially coextensive with said chamber, and a movable, second wall opposite said first wall and coextensive with said chamber;
   ink supply means coupled to said inlet; and
   transducer means, including an elongated member having an axis of elongation which is perpendicular to said elongated array, said elongated member being adapted to expand and contract along said axis of elongation in response to its state of energization to move said second wall of said chamber substantially as a plane toward said plurality of ejection orifices, for simultaneously ejecting droplets with substantially uniform velocity from each orifice of said plurality of ejection orifices.

2. The ink jet apparatus of claim 1 wherein said plurality of orifices are in open communication throughout said chamber without intermediate restrictions.

3. The ink jet apparatus of claim 1 wherein said transducer means comprises an integral piezo-electric member forming said second wall.

4. The apparatus of claim 1 wherein said transducer means is juxtaposed to said orifices.

5. The apparatus of claim 4 further comprising a foot member coupling said transducer means to said chamber.

6. The apparatus of claim 5 wherein said plurality of orifices is substantially linearly arranged for generating a plurality of droplets linearly arranged in response to said energization of said transducer means.

7. The apparatus of claim 1 wherein said orifices in said chamber are linearly arranged.

8. The impulse ink jet apparatus of claim 1 wherein said orifices are equally spaced from the edge of said first wall.

9. The impulse ink jet apparatus of claim 1 wherein each of said orifices are spaced a distance from the edge of said first wall equal to at least half a distance between said orifices.

10. The impulse ink jet apparatus of claim 1 wherein said orifices are substantially uniformly distributed on said first wall.

11. A method of simultaneously generating a pattern of droplets on demand utilizing an impulse ink jet apparatus comprising a chamber having a first wall and a second wall, a plurality of orifices in said first wall forming an array substantially coextensive with said chamber, and means for changing the volume of ink in said chamber, said method comprising the following steps:
    changing the volume of ink in said chamber by moving said second wall substantially as a plane towards said first wall, wherein said plane is substantially parallel to said array; and
    simultaneously ejecting a droplet from each orifice of said plurality of orifices at a substantially uniform velocity.

12. The method of claim 11 including the repetition of said steps.

13. The method of claim 11 wherein the droplets are ejected in a linear pattern so as to form a bar.

14. The impulse ink jet apparatus comprising:
    a plurality of chambers with each of said chambers including an inlet and a plurality of ejection orifices arranged substantially coextensive with said chamber;
    ink supply means coupled to said inlet; and
    a plurality of transducer means respectively coupled to said chambers to form a movable wall in each said chamber that is substantially coextensive with its respective chamber for ejecting droplets with substantially uniform velocity from each of said plurality of ejection orifices of each of said chambers in response to the state of energization of each of said plurality of transducer means, each said transducer means including an elongated member having an axis of elongation which is perpendicular to said plurality of ejection orifices;
    wherein said elongated member is adapted to expand and contract along said axis of elongation in response to its state of energization to move said wall substantially as a plane toward said plurality of ejection orifices.

15. The impulse ink jet apparatus of claim 14 wherein said orifices within each of said chambers are substantially linearly arranged.

16. The impulse ink jet of claim 15 wherein said orifices within one of said chambers are substantially linearly arranged so as to be parallel but offset from said orifices within another of said chambers which are substantially linearly arranged.

17. The impulse ink jet apparatus of claim 15 wherein said orifices within one of said chambers are substantially linearly arranged so as to be co-linear with said orifices within another of said chambers.

18. The impulse ink jet apparatus of claim 14 wherein said orifices within each of said chambers are disposed so as to correspond with segments of an alpha-numeric character.

19. The impulse ink jet apparatus of claim 18 wherein said orifices within each of said chambers are disposed so as to correspond with linear segments of an alphanumeric character.

20. A bar code ink jet apparatus comprising:
    an impulse ink jet chamber including a plurality of linearly aligned orifices extending substantially coextensive with said chamber in a first wall thereof, said chamber also including a movable second wall that is substantially coextensive with said chamber;
    means for simultaneously ejecting a plurality of droplets from said linearly aligned orifices with substantially uniform velocity by moving said second wall substantially as a plane towards said first wall, wherein said plane is substantially parallel to said linearly aligned orifices;
    means for creating a relative scanning motion between said ink jet chamber and a target for receiving said droplets; and
    means for controlling said means for simultaneously ejecting so as to sequentially eject a plurality of droplets and to deposit said pluralities of droplets in bars of varying widths.

21. The bar code ink jet apparatus of claim 20 further comprising:
    another impulse ink jet chamber including a plurality of linearly aligned orifices;
    another means for simultaneously ejecting a plurality of droplets from said aligned orifices with substantially uniform velocity;
    another means for controlling said other means for simultaneously ejecting droplets so as to sequentially eject pluralities of droplets and to deposit said plurality of droplets in an additional segment of said bars of varying widths; and
    said means for creating scanning motion also creating scanning motion between said additional chamber and said target.

22. The bar code ink jet apparatus of claim 21 wherein said orifices of each of said chambers are parallel or co-linear so as to permit the deposit of bars having a length equal to the composite length of said orifices in said chambers.

23. The bar code ink jet apparatus of claim 22 wherein said orifices are co-linear.

24. The bar code ink jet apparatus of claim 23 wherein said orifices of said chambers are parallel and displaced in the direction of scanning.

25. The bar code ink jet apparatus of claim 21 wherein the overall length of the orifices of said other chamber substantially double the overall length of said chamber so as to permit the deposit of full bars by the orifices of said other chamber and half bars by the orifices of said chamber.

26. A bar code ink jet apparatus comprising:
    a plurality of ink jet chambers, each of said chambers including a first wall, a movable second wall, and a plurality of linearly aligned orifices that extend substantially coextensive with said chamber along said first wall, where the orifices in one of said chambers are parallel with the orifices in another of said chambers;
    means for simultaneously ejecting a plurality of droplets from said aligned orifices in each of said chambers with substantially uniform velocity by moving said second wall substantially as a plane towards said first wall, wherein said plane is substantially parallel to said linearly aligned orifices;

means for creating a relative scanning motion between said ink jet chambers and a target for receiving said droplets; and means for controlling said means for simultaneously ejecting so as to selectively eject a plurality of droplets from orifices of one or more than one of said chambers thereby controlling the overall length of the bars deposited on the target.

* * * * *